E. R. HEWITT AND J. H. BLAKE, Jr.
BODY FOR FARM TRUCKS.
APPLICATION FILED JUNE 24, 1921.
1,422,859.
Patented July 18, 1922.
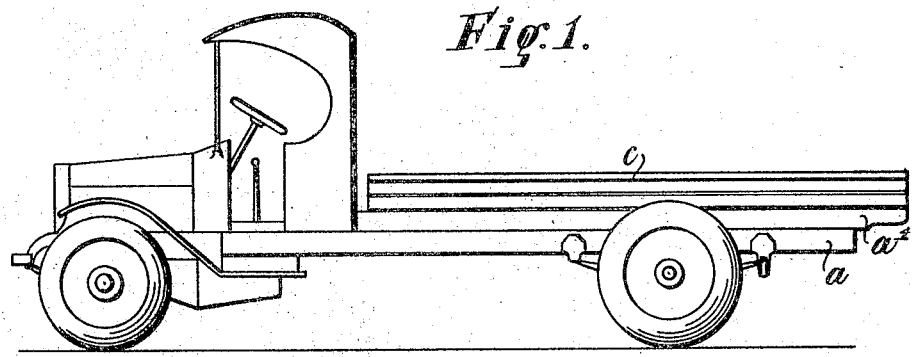
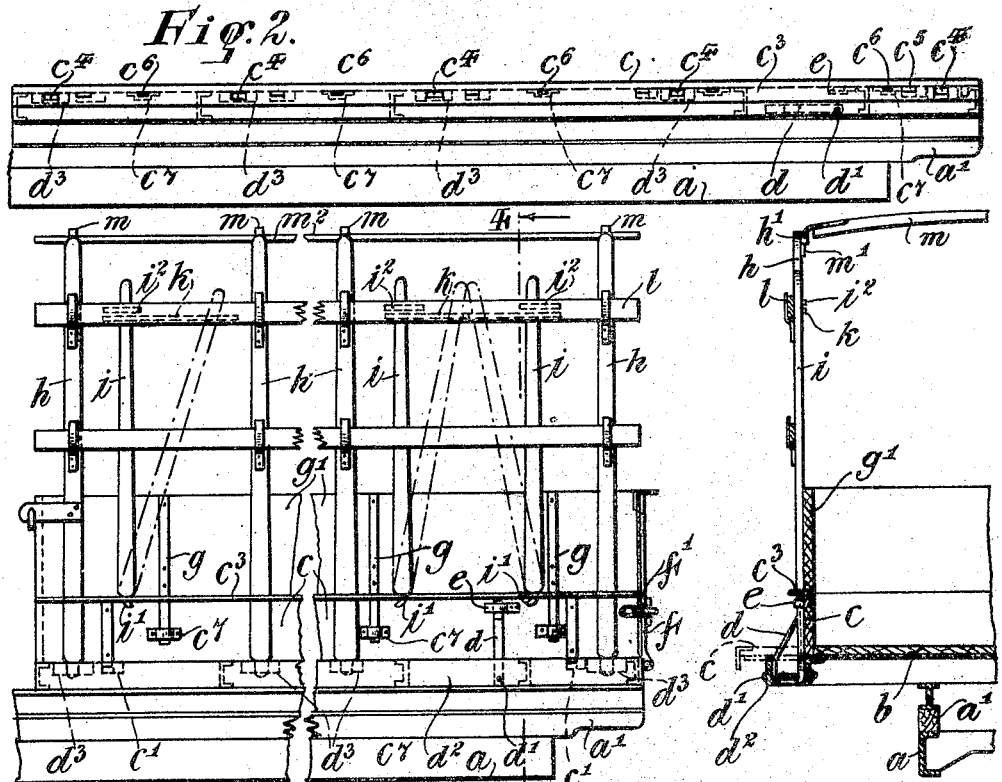

UNITED STATES PATENT OFFICE.

EDWARD R. HEWITT, OF MIDVALE, AND JOHN H. BLAKE, JR., OF EAST ORANGE, NEW JERSEY, ASSIGNORS TO INTERNATIONAL MOTOR COMPANY, OF NEW YORK, N. Y., A CORPORATION OF DELAWARE.

BODY FOR FARM TRUCKS.

1,422,859.  Specification of Letters Patent.  Patented July 18, 1922.

Application filed June 24, 1921. Serial No. 480,210.

*To all whom it may concern:*

Be it known that we, EDWARD R. HEWITT and JOHN H. BLAKE, Jr., citizens of the United States, residing, respectively, at Midvale and East Orange, in the State of New Jersey, have invented certain new and useful Improvements in Bodies for Farm Trucks, of which the following is a specification, reference being had to the accompanying drawing, forming a part hereof.

Farm bodies for general use on motor vehicles are subject to very severe conditions and for that reason are often so constructed as to be unhandy in use. So far as known such bodies have generally been constructed of wood heavily reinforced with iron or steel fittings. This wood splinters and rots and swells and shrinks and the sectional portions of the bodies are therefore seldom interchanged since a snug fit and handy manipulation are practically impossible of accomplishment. In accordance with the present invention it is proposed to provide a body for farm uses which is convertible readily from one type into another to take care of all of the usual occasions from hauling hay to hauling cattle. Incorporated in the range of convertible bodies offered by the improved type may be enumerated the clear flat platform body, box body, express body, stake body, hay rack and live stock rack. The stakes and extensions employed are adapted to fit removably into the hinged sides of the body, these hinged sides when lowered forming an unbroken extension of the bed and a wide clear platform. The live stock rack which forms one of the principal improvements is so made as to resemble the usual type of stall racks generally found in barns whereby the heads of the cattle may be locked by swinging stanchions. Other features of the invention having to do with the locking means for the stanchions and with the retaining devices for the hinged walls of the box body will be described in detail hereinafter in connection with the embodiments illustrated in the drawing, wherein—

Figure 1 is a view in side elevation of a truck provided with the improved body, all of the accessories to the box body being omitted.

Figure 2 is a fragmentary view in side elevation showing the hinged sides of the body of Figure 1 lowered to form a platform type with the body bed.

Figure 3 is a view in side elevation of the improved body with extension sides and stanchions forming a cattle rack, the body being broken.

Figure 4 is a view in transverse section through the body shown in Figure 3 and taken on the plane indicated by the line 4—4 of Fig. 3 and looking in the direction of the arrows.

Figure 5 is a fragmentary view in plan of the body shown in Figure 1.

The chassis $a$ of the vehicle has mounted thereon in any suitable manner, as by means of sills $a'$, what may be an all-steel body including a base $b$ having sides $c$ hinged at $c'$ so that they may be lowered to the position shown in Figure 2 and with the bed $b$ afford a clear flat platform body. The sides $c$ are normally braced in vertical position by means of triangular steel braces $d$ pivoted at the lower side of the body on bolts $d'$ which carry channel bolsters $d^2$ into which the triangular braces are lowered when the sides are dropped on to the bolsters, as indicated in dotted lines in Figure 4. The braces $d$ are held in vertical position by means of steel spring clamps $e$ which are secured to the sides $c$ and lie over guides $c^2$. The spring clamps may have their noses beveled to permit the braces to snap behind them in a manner which will be understood. To the rear end of the body is hinged a tail-gate $f$ which may be secured to the sides $c$ when the latter are raised by links $f'$ in accordance with common practice.

The upper edges of the sides $c$ carry angle pieces $c^3$ which have stamped therein at suitable intervals various openings $c^4$, $c^5$, $c^6$, for purposes which will later appear. The sides $c$ may have secured thereto metal straps or pockets $c^7$ which are in line, respectively, with certain of the openings $c^6$ to receive stakes $g$ secured to upper side members $g'$ which may be applied for the purpose of forming a high box body. It will be understood also that these additional side sectitons $g'$ might flare to form the usual type of express body, the supporting stakes $g$ in both instances passing through the openings $c^6$ and engaging the pockets $c^7$ to insure rigidity.

To form a haystack, stakes of any suitable length might be dropped into the openings $c^4$ and extend upwardly any desired distance to retain hay, straw or the like.

To form a cattle rack, it is proposed to drop side stakes $h$ through the openings $c^4$ and into engagement with additional straps or pockets $d^3$ carried with the bolster structure $d^2$ below the hinge line of the sides $c$. Additional swinging stanchion stakes $i$ have at their lower ends curved metal hooks $i'$ which may be engaged with the other openings $c^5$ in the angle piece $c^3$ along the upper edges of the swinging sides $c$. These stanchion stakes $i$ are guided in their swinging movements adjacent their upper ends by straps $k$ secured on the inner sides of rails $l$ supported on the side stakes $h$. The swinging stanchion stakes $i$ are in such number and in such relation to each other and to the side stakes $h$ as to accommodate comfortably the maximum number of cattle on the body. For instance, as shown in Figure 3, it has been found that two stanchion stakes $i$ may conveniently be placed between the two end side stakes $h$. The stanchion stakes $i$, when swung together, as indicated in dotted lines, afford relatively large openings between them and the respective proximate side stakes $h$ for the reception of the heads of cattle. When thus swung towards the respective proximate side stakes the heads of cattle will be dropped between the respective stanchion stakes $i$ and the proximate side stakes $h$ in a manner commonly found in barn structures. The stanchion stakes $i$ have their upper ends held releasably in locking position by means of steel spring clamps $i^2$ which are also mounted on the longitudinally extending side rails $l$ and in proximity to the guide straps $k$. It is evident that the construction of the stakes with the hooks $i'$ at their lower ends will enable them to be quickly stepped or unstepped from the sides $c$.

Each pair of side stakes $h$ may be braced at their upper ends by means of cross bows $m$ which may be engaged detachably with them by means of hooks $m'$ co-operating with pockets or straps $h'$ secured adjacent to the upper ends of the stakes. A ridge pole $m^2$ may pass longitudinally of the body and be engaged with the cross bows $m$ at their mid-points. This rigging constitutes a convenient frame work for a tarpaulin to enable the body to be closed against the weather.

Changes in details will suggest themselves in the improved convertible body, but any such changes as constitute merely mechanical skill are to be deemed within the spirit of the invention provided they constitute the mechanical equivalents of the elements recited in the appended claims.

We claim as our invention:

1. In a farm body for motor vehicles an all-steel bed, steel sides hinged thereto, unitary triangular steel braces pivotally supported at the sides of the bed and adapted to engage the sides of the body to support them in vertical position to form a box body, said braces being movable independently of the sides to a point below the hinge line to permit the sides to swing downwardly and outwardly into line with the bed to form a platform body, and bolsters secured at the side of the bed to support the sides in lowered position and house the braces when in lowered position.

2. A farm body for motor vehicles comprising a bed, sides hinged thereto and provided in their upper edges with openings to support side stakes for a cattle rack swinging stanchion stakes to engage the heads of cattle supported releasably on the sides, and means carried with the side stakes to hold the stanchion stakes releasably in predetermined position.

3. A farm body having a cattle rack supported at its sides and comprising swinging stanchion stakes pivotally supported at their lower ends, guides for the upper ends of the stanchion stakes and spring latches to retain the upper ends of the swinging stanchions releasably in predetermined position to hold the heads of cattle.

This specification signed this 21st day of June, 1921.

EDWARD R. HEWITT.
JOHN H. BLAKE, Jr.